United States Patent

[11] 3,594,564

[72] Inventor Robert F. Kane
New York, N.Y.
[21] Appl. No. 794,923
[22] Filed Jan. 29, 1969
[45] Patented July 20, 1971
[73] Assignee Dialscan Systems, Inc.
New York, N.Y.

[54] DECIMAL-TO-BINARY CONVERTER WITH CROSSBAR SWITCH
9 Claims, 6 Drawing Figs.
[52] U.S. Cl. .................................................. 235/154, 179/18 TR
[51] Int. Cl. .................................................. H04l 3/00, G06f 3/00
[50] Field of Search ....................................... 235/155; 179/18 TR; 340/324, 324.1

[56] References Cited
UNITED STATES PATENTS
3,087,149 4/1963 Malcolm ...................... 235/155
3,090,833 5/1963 Zenner ......................... 235/155
3,399,279 8/1968 Bierman ....................... 179/18 TR Primary Examiner—Maynard R. Wilbur
Assistant Examiner—Jeremiah Glassman
Attorney—Jack Oisher ABSTRACT: A decimal-to-binary or alpha-numeric-to-binary converter is described for converting telephone dial pulses or tones into binary coded form for transmission to a computer for processing. A crossbar switch is used, whose horizontals are associated with particular characters and whose verticals are operated in succession upon receipt of the next digit. The horizontal movable contacts are prewired in the desired binary code, which is derived by preferably scanning in succession all of the outputs of each vertical unit.

3,594,564

DECIMAL-TO-BINARY CONVERTER WITH CROSSBAR SWITCH

This invention relates to converters or translators for converting signal information in decimal or alphabetic form into binary form suitable for processing by computer.

Many systems have been proposed utilizing computers to assist or increase the efficiency of business enterprises. Among the various fields greatly in need of computer assistance is department store accounts. Most department stores have charge systems enabling customers to charge merchandise to their account. There is usually no limit to the credit extended in that the customer can purchase over a period of time an enormous amount of merchandise before he is billed and perhaps defaults in payment. As credit does not terminate until default in payment actually occurs, the department store may sustain large losses. In fact, such losses on a nationwide scale have exceeded many millions of dollars annually. Efforts have thus been exerted to devise a system for checking the current status of a customer's account before finalizing the sale of merchandise to him. As most sales areas have ready access to telephones, it is conceivable for the sales personnel to phone the accounting department and verbally obtain from an employee in the accounting department information regarding the current status of the customer's account. For not too large department stores having a single location, the aforesaid scheme may be feasible. For modern department stores having many locations within a single city, and other locations in other cities, with a centralized or common accounting department, such a scheme is not economically feasible as it requires huge numbers of telephone lines as well as an enormous number of operators at the accounting location to handle the deluge of calls that can occur during a busy shopping period.

Computers are available at accounting departments and most customers' accounts are now computerized and processed automatically. Moreover, the speed of a computer lends itself to storing all of the customers' accounts, to instantaneously recording all transactions involving that account, and to making available an up-to-date summary of the status of each customer's account on demand. But such computers operate on the binary system, while the source of the information concerning a particular transaction is, for example, an individual in a sales department.

The chief object of our invention is to provide a system for taking information generated at a telephone usually in decimal form as pulses or tones, or alphabetic form as tones, and for converting it into binary form capable of being processed by a computer.

Another object of the invention is an alpha-numeric-to-binary converter capable of storing the information in binary form so that it can be accessed one or more times by a computer when desired.

A further object of the invention is apparatus which will accept telephone dial pulses or tones representative of decimal or letter characters and translate them into a combination of bits in a binary code for serial transmission to a processing center.

These and further objects of the invention are achieved using a crossbar switch as the main element. Briefly speaking, suitable circuits are provided to convert the dial pulses or tones generated at a telephone handset and representative of a character such as a decimal number or letter of the alphabet into a signal capable of operating a horizontal of the crossbar associated permanently with that character. Means are further provided to cause each character in turn to operate a successive vertical of the crossbar, thereby closing a set of contacts. Each set of contacts is permanently wired to represent a binary digit or letter characteristic of the dialed or toned digit or letter. The information generated at the handset is thus stored or registered in the operated crossbar in binary form. When required, means are provided to access all of the crossbar contacts in parallel or serially. In the latter case, there is thus provided on a single line or circuit in serial form the information stored in the crossbar, which is then readily transmitted to a computer center for processing. Among the advantages are simplicity, low cost, the reliability of telephone-switching equipment, long life and low maintenance, as well as flexibility of application and type of coding desired to be used.

Various other features and modifications of our system will be found in the detailed description that follows, reference being had to the accompanying drawings wherein.

Figure 1:
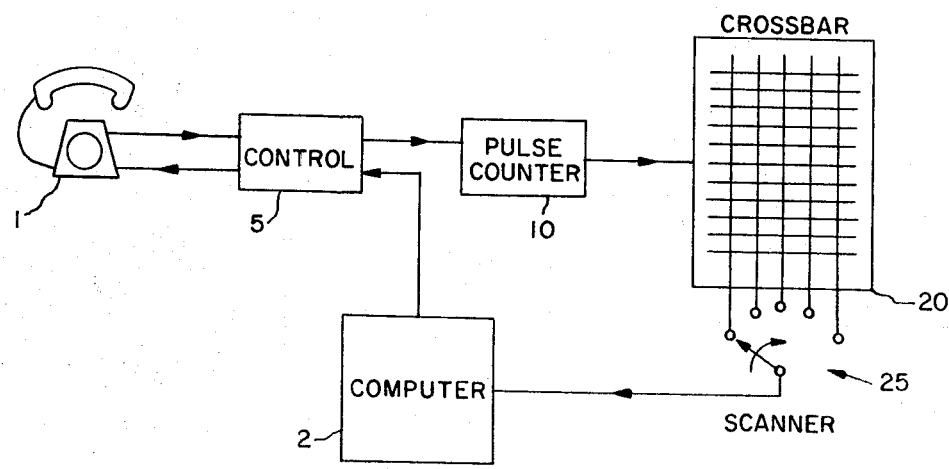
FIG. 1 is a block diagram of one form of decimal-to-binary system utilizing the invention.
Figure 3:
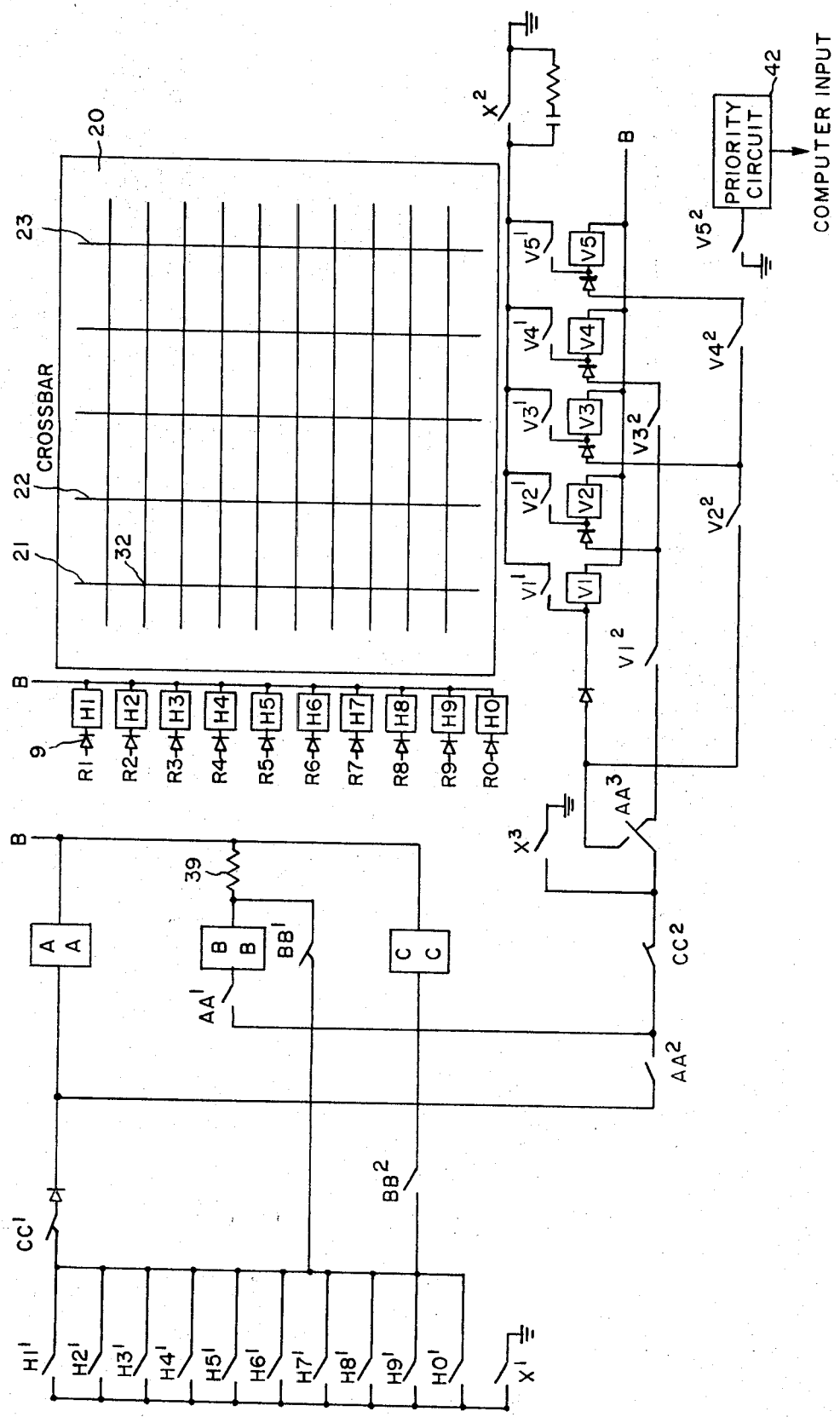
Figure 4:
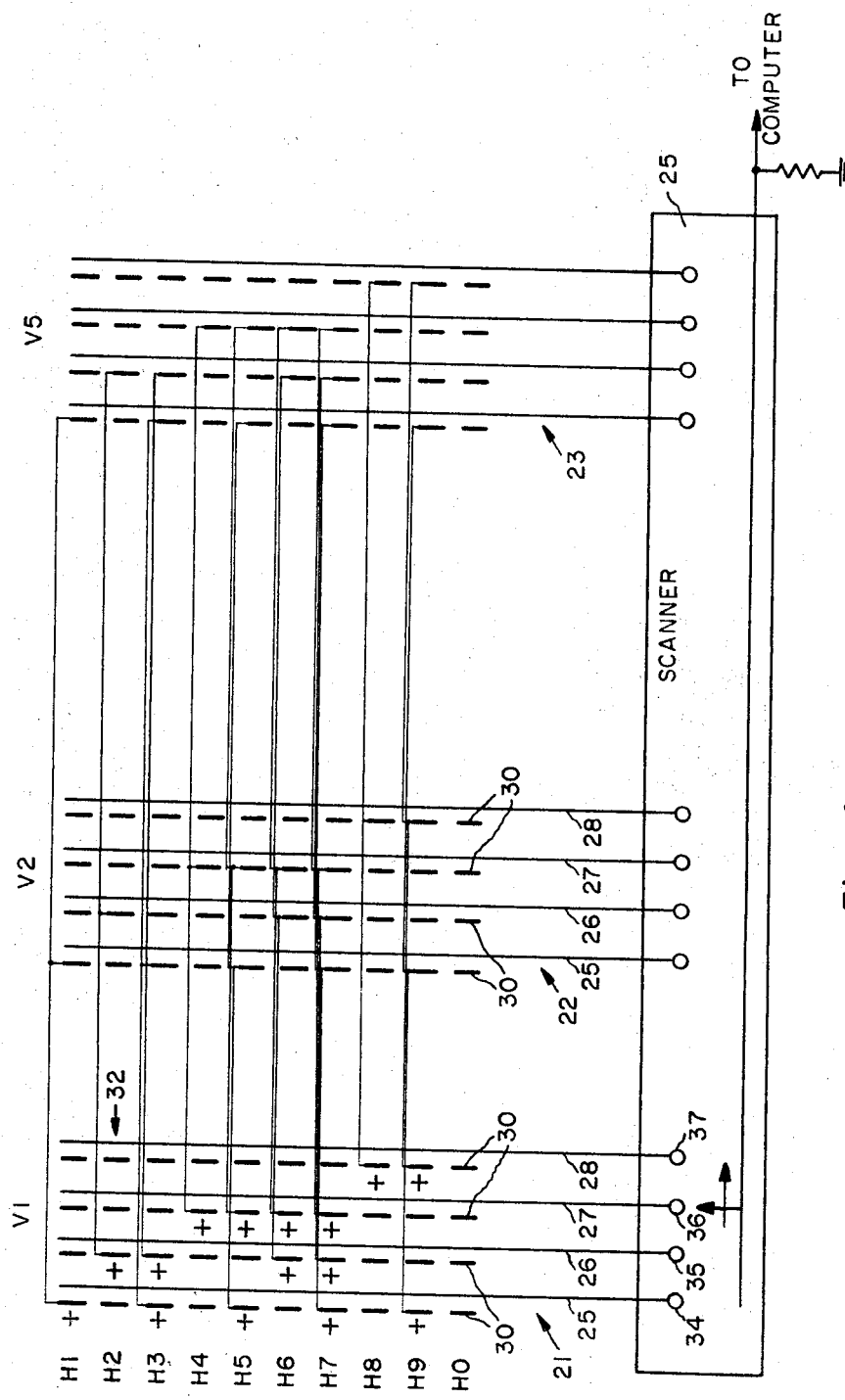
Figure 5:
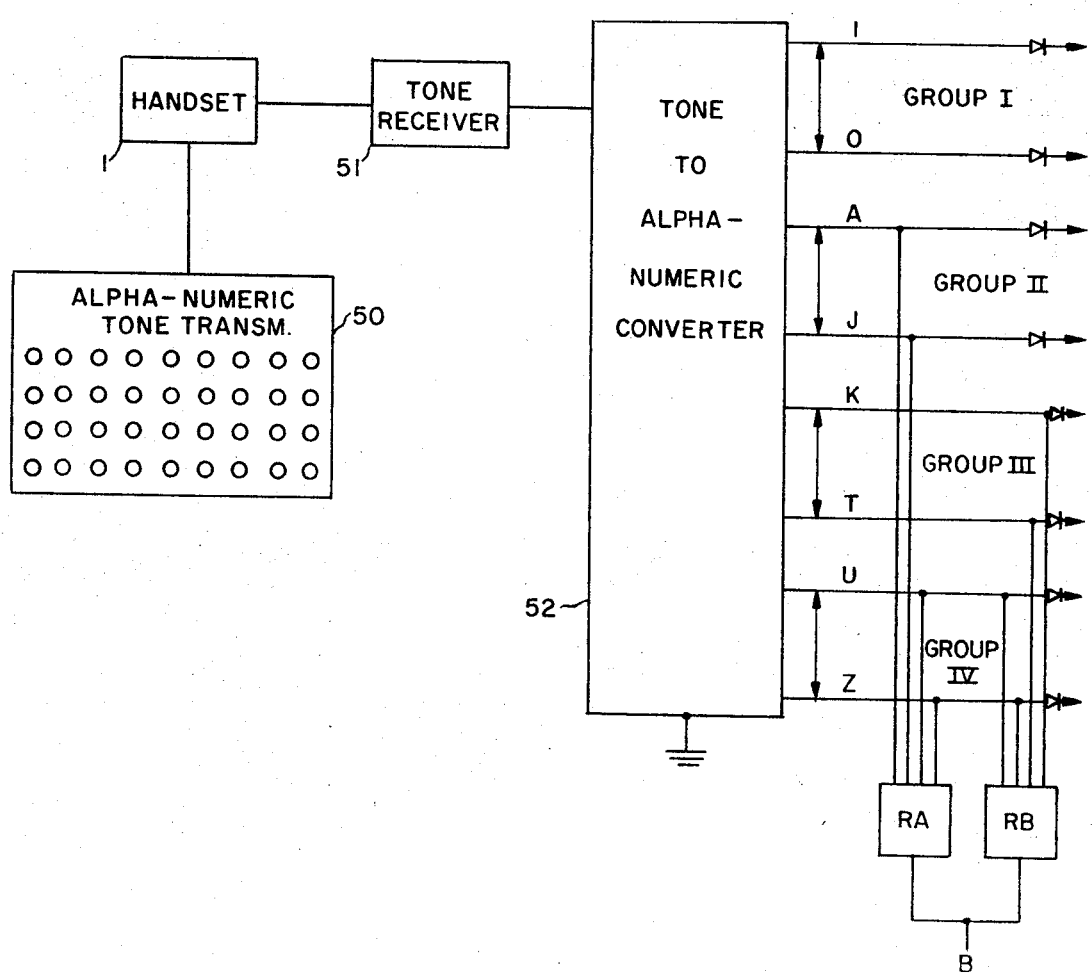
Figure 6:
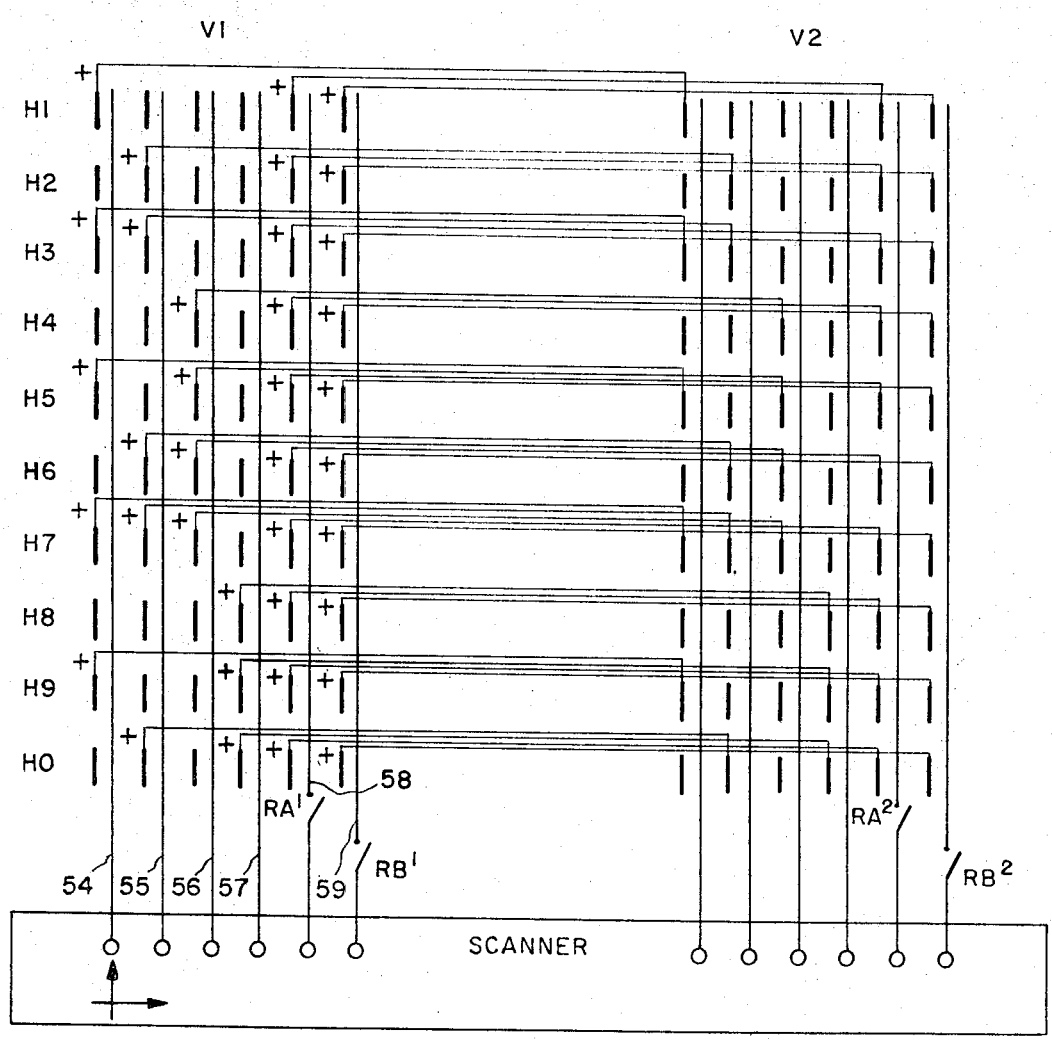

FIGS. 3 and 4 provide details of the crossbar circuitry of the system illustrated in FIG. 1;

FIG. 5 is a block diagram of an alphanumeric-to-binary converter of the invention;

FIG. 6 shows details of the crossbar circuitry of the converter of FIG. 5.

FIG. 1 illustrates in block diagram one form of system employing the crossbar converter of the invention. A telephone handset 1 would be located at a position requiring access to the computer. While not essential, the telephone conveniently would be coupled to a private branch exchange which in turn via leased lines or similar communication links would be connected to a centrally located computer 2. The computer would have stored in its memory banks the accounts of all customers, accessible by a suitable binary code number which can be selected either to make inquiries of the customer's account or to make entries of data into the memory bank. At the handset location will be provided a convenient codebook to advise sales personnel, for instance, how to interrogate the computer to determine the current status of a customer's account.

When the sales transaction is ready for completion, the salesman picks up the receiver and, as is usual with private branch exchanges, dials a single digit which connects him with a control circuit 5. If the equipment is idle, a dial tone is heard and the salesman then proceeds to dial a decimal code number containing information for selecting the customer's account and for instance, the amount of the potential sales transaction. Each dialed digit in decimal form results in a series of dial pulses equal in number to the dialed digit. As is common in modern telephone systems, the dial pulses are counted in a conventional pulse counter 10 marking one of its outputs permanently associated with a particular digit. Thus, for the numbers 0—9, the counter 10 would have 10 outputs each corresponding to one of the numbers 0—9. For instance, if the digit 2 is dialed, the two-output of the counter becomes marked.

The counter output is coupled to the horizontals of a crossbar switch 20 having at least as many horizontals as counter outputs, with each counter output in turn permanently connected to one of the horizontals. Thus, the one-counter output is connected to the one-horizontal, the two-counter output to the two-horizontal, the three-counter output to the three-horizontal, and so on. Thus, when the counter two-output is marked, the two-horizontal is operated. If the digit 2 is the first digit dialed, operation of the two-horizontal immediately operates the first vertical unit of the crossbar. The operated horizontal is then released.

When the second digit is dialed, for instance a 3, the three-output of the counter is marked which immediately operates the three-horizontal. As this is the second digit, the second vertical is operated, and so on. Hence, each decimal dialed operates an associated horizontal, and each digit dialed operates in turn the next vertical. If the code contains, for instance, 20 digits, then the crossbar will require 20 verticals. Each time a vertical is operated, a set of contacts is closed corresponding to the selected horizontal. And each set of contacts associated with each of the horizontals, containing at least four contacts in a set for the usual binary code, is permanently wired in a binary code corresponding to a particular decimal. Thus, a standard binary code uses 1,000 to represent the decimal 1, 0100 to represent the decimal 2, 1100 to represent the decimal 3, and so on. Any suitable marking system may be employed to establish the binary code in the crossbar. One convenient system is to establish a positive potential on the contacts representing 1, and ground or no potential on the contacts representing 0. When a selected contact set is closed, there thus becomes available at the vertical contact strips of that particular vertical (assuming four as before) a set of four potential values representing the dialed decimal in binary form.

When all of the dialed digits have been stored in operated verticals, a signal is furnished to the computer advising that the crossbar is ready to be accessed. All outputs can be accessed in parallel and thus simultaneously. With 20 verticals each having four outputs, 80 lines to the computer will be required. The required number can be greatly reduced by serially reading each of the outputs of all of the verticals by a known scanner 25.

The computer 2 then processes the inquiry and reports directly to the salesman by a voice recording that the account is satisfactory and the sales transaction can be consummated, whereupon the crossbar is released and becomes available for the next interrogation. For a 20-digit code using dial handsets, the time normally required to fill the crossbar is approximately 400 milliseconds. The time it would take a modern high-speed computer to process the inquiry is under 5 milliseconds. Thus, the single computer could readily service up to 80 crossbars and thus nearly 200 transactions per second, which is adequate for most department stores. Should the customer's account information be unsatisfactory, the computer can be programmed to signal a supervisor who can connect into the salesman's line to communicate with him. The information stored in the crossbar remains there until released, and while stored can be accessed as often as required by the computer.

In the detailed description that follows, only those system components that are not conventional or readily available commercially have been illustrated in detail while conventional equipments are shown only in block form, as those skilled in this art will readily recognize how to obtain or connect up such well-known equipment as, for instance, a pulsing and counting circuit for counting dial pulses from a telephone handset and marking, usually with ground, an output corresponding to the decimal number dialed, and an interdigital timer for releasing the operated horizontal.

Figure 2:
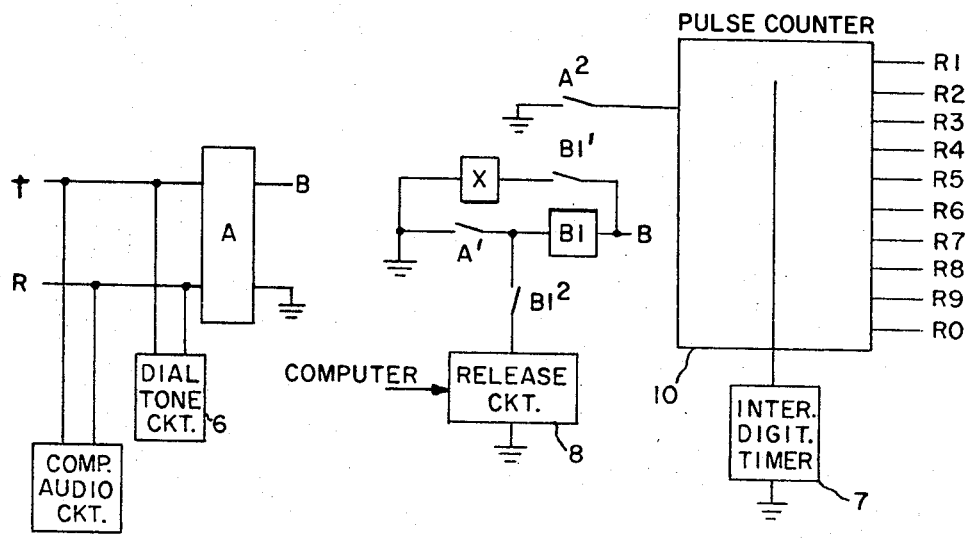
FIG. 2 is a schematic circuit providing more details of the control and pulse counter circuits of the system illustrated in FIG. 1.

FIG. 2 shows in schematic form the handset 1 connections to the pulse counter. In operation with a private branch exchange, the user lifts the receiver and upon receiving dial tone dials a code (for example 9) providing access to the computer. If the system is idle, by conventional means a second dial tone is provided the user via terminals T and R (tip and ring) from a conventional dial tone circuit 6 including the conventional circuitry preventing access until the equipment is idle. On receiving the second dial tone, the user dials the first digit of the selected code, for example, a 2. The first pulse of the two-pulse train operates the A relay having balanced windings coupled respectively to B, representing battery or a suitable potential source in the drawings, and ground. Termination of the pulse releases the A-relay. Each successive pulse operates and releases the A-relay. Normally open contact $A^2$ of the A-relay follows its operation, thereby permitting the dialed pulses into the pulse counter 10, which in a conventional manner counts the pulses marking with ground through a standard interdigital timer 7 one of the 10 outputs R1—R0 of the counter. The interdigital timer is turned on, as is known in the art, by the first pulse-extending ground to the counter 10 and then automatically releases in 20—30 milliseconds, the time it takes to dial and transmit the number of pulses in the largest digit. Thus, with a dialed 2, R2 is grounded for 20—30 msec.

Another normally open contact $A^1$ of relay A when closed operates relay B1, whose normally open contact $B1^1$ operates relay X, a second B1 relay contact $B1^2$ forming a locking path for B1 relay through a release circuit 8 which is normally closed but can be opened by a signal from the computer, normally given after the crossbar has been accessed, to release the B1 and X relays.

Referring now to FIG. 3, the counter outputs R1—R0 are connected via isolation diodes 9 each to one of the crossbar horizontal select magnets H1—H0, connected on the opposite side to battery B. The marked output, R2 for the example, thus operates select magnet H2. As is known, standard crossbars 20 comprise horizontal select magnets and vertical hold magnets defining cross-point sets of contacts equal in number to the product of the horizontal and vertical magnets. Operation of a particular select magnet followed by operation of a particular hold magnet will close one set of contacts at their intersection. The contact set remains closed even though the select magnet is released until the hold magnet is released. Each vertical unit associated with each hold magnet comprises a plurality of vertical contact strips or columns that are common to all the select magnets, but each select magnet has a set of independent contacts for making contact with the vertical contact strips. Three of the vertical units designated 21, 22, and 23 associated with hold magnets V1, V2, and V5, respectively, are illustrated in greater detail in FIG. 4. In vertical unit 22, four vertical contact strips are designated 25, 26, 27, and 28. Associated with each, for each select magnet, is a movable contact 30. Thus, each set of cross-point contacts includes four separate movable contacts 30 with the four contact strips 25—28. Thus, when H2 is operated and then V1, closing cross-point set 32, four contacts are closed, and the potential on each movable contact 30 (potential as used herein includes positive, negative, ground, and zero potentials, the latter including no potential) is extended to the associated vertical contact strip 25—28 and made available at its lower output terminals 34—37.

Returning now to FIG. 3, each select magnet H1—H0 has associated with it a standard horizontal off-normal contact $H1^1$—$H0^1$ which close when the select magnet operates. Similarly, each hold magnet V1—V5 has associated with it vertical off-normal contacts $V1^1$—$V5^1$ and $V1^2$—$V5^2$ which close when the hold magnet operates. The horizontal off-normal contacts $H1^1$—$H0^1$ are connected in parallel through an X-relay contact $X^1$ to ground on one side, and on the other side to a circuit designed to cause each successive dialed digit to operate the next successive hold magnet. This is achieved using three auxiliary relays AA, BB, and CC, and the crossbar off-normal contacts. It operates as follows.

As will be recalled, on the first pulse of the first dialed digit, X-relay operates and remains closed until the computer releases it. Operation of X-relay closes contact $X^1$ connected to the horizontal off-normal contacts, $X^2$ connected to the vertical off-normal contacts, and $X^3$. When the selected horizontal magnet operates, say H2, its contact $H2^1$ closes operating relay AA, transferring contact $AA^3$ operating the hold magnet V1. Contact $AA^2$ forms a locking path to ground for relay AA. While $AA^1$ also closes, relay BB remains shunted by its own normally closed contact $BB^1$ through a dropping resistor 39. After the 20—30 msec. delay provided by timer 7 (FIG. 2), the ground is removed from R2 releasing H2, removing the shunt from relay BB which operates, opening contact $BB^1$ and closing contact $BB^2$ establishing an operating path for relay CC. When the second digit is dialed and counted operating, for instance, H1, closing $H1^1$, relay CC operates opening contact $CC^1$ and $CC^2$ releasing relay AA, which opens contact $AA^1$ releasing relay BB (relay BB is chosen to have a longer release time than that of AA so that relay BB always releases after relay AA).

Meanwhile, when hold magnet V1 operated, its contacts $V1^1$ and $V1^2$ closed. $V1^1$ forms a locking path through contact $X^2$ keeping V1 operated, and $V1^2$ establishes an operating path for the next hold magnet V2. Thus, when relay AA releases on the second digit, transfer contact AA shifts back extending ground to V2, which operates. At about the same time, release of relay BB opens contact BB² releasing relay CC, and then the select magnet H1 releases through the timer 7, restoring the auxiliary relays to their normal position. Contact V2¹ forms a locking path for hold magnet V2, and contact V2² establishes an operating path for hold magnet V3. On the third digit, again relay AA operates and the next hold magnet V3, followed by relay BB when the select magnet releases; on the fourth digit, relay CC is operated releasing AA, BB, operating the fourth hold magnet V4 and then releasing, and so on, for as many vertical units as exist in the crossbar, which depends upon the code used. Five have been shown in the drawings for illustrative purposes only, as in practice from 12—20 vertical units would be employed. However the principles remain the same.

When the last hold magnet V5 is energized, again one contact V5¹ establishes a locking path, but the other V5² extends ground through a standard priority circuit 42 on to the computer input informing the computer that the crossbar is filled ready for accessing. Standard priority circuits are known. An example will be found in my copending application, Ser. No. 726,733, filed May 6, 1968.

The dialed digits are stored in the operated vertical units. As illustrated in FIG. 4, by applying to the movable contacts 30 potentials in a desired binary code, the selected horizontal determines the digit in binary form that will be transferred to the computer. In FIG. 4, the + sign designates a small positive potential, and the absence of a + sign designates no potential or ground. It will be observed that a standard binary coding is used for the numbers 1—0. Since all the cross-points associated with a particular horizontal have the same coding or potentials, they can be wired in multiple as illustrated, making for relatively inexpensive manufacture of the wired crossbar. Only V1, V2, and V5 are shown, the other vertical units being similar. On demand from the computer, each of the output terminals 34—37 of all the vertical units are contacted in succession, transmitting the stored binary code along a single line. Reaccessing can take place as often as desired. On a signal from the computer, the release circuit 8 (FIG. 2) is opened releasing relay B1 and relay X, which releases the crossbar, which is then ready for the next interrogation. The scanner 25 may be any conventional piece of equipment, electronic for high-speed operation or electrical, for example, a selector switch, where slower operation is acceptable. Usually, the time for accessing the crossbar will be much shorter than the time required to fill the crossbar. It will further be evident to those skilled in this art that conventional equipment may also be employed to enable the system to operate with handsets generating tones instead of pulses, the only requirement being that a converter be provided able to detect tones and mark a suitable output for operating a horizontal associated with that tone. My copending application describes one suitable system. FIG. 5 illustrates another in connection with one form of alphanumeric-to-binary converter in accordance with the invention.

In the FIG. 5 system, an alpha-numeric tone transmitter 50, commercially available, is connected to the handset 1. Such known equipment includes 36 buttons for the 26 letters of the alphabet plus the 10 numbers 1—0. The handset 1 would still be used to make the connection to the system, after which the user would press buttons corresponding to the desired code. Known tone transmitters usually can generate 14 tones, with each button selecting three out of the 14 tones to determine a particular letter or number. The tones would be detected by a conventional tone receiver 51 and the resultant three tones of the code converted by a standard tone-to-alphanumeric converter 52, also commercially available, into one of 36 outputs, usually by marking with ground. FIG. 5 illustrates the 36 outputs divided into four groups. Group I comprises 10 outputs corresponding to numbers 1—0; group II includes 10 outputs corresponding to letters A—J; group III comprises 10 outputs corresponding to letters K—T; and group IV six outputs corresponding to letters U—Z. Two auxiliary relays RA and RB are provided. Relay RA is connected to all of the outputs of group II and group IV, and relay RB is connected to all of the outputs of group III and group IV. When a particular output is marked, it also operates the connected auxiliary relay RA and RB.

In the same manner as described in connection with FIG. 3, each output operates an associated select magnet, except that all corresponding outputs of the four groups are connected to the same select magnet. Thus, outputs 1, A, K, and U all operate select magnet H1; outputs 2, B, L, and V all operate select magnet H2; and so on. Another difference is that each vertical unit comprises six vertical contact strips 54—59 (FIG. 6) instead of four, and in the last two vertical contact strips 58 and 59 are connected respectively normally open contacts RA¹ and RB¹ of the auxiliary relays. The potentials applied to the horizontal movable contacts of the first four strips 54—57 are the same as in the FIG. 4 embodiment, and the potentials applied to the last two strips 58 and 59 are all positive. As before, all the vertical units, only two of which are shown, contain the same number of strips in the same arrangement and thus may be wired in multiple. A binary code containing six bits is now used. As will be evident, for the numbers 1—0, with relays RA and RB normal, two 0s are added at the end of each binary code. Thus, the number 1 is represented by 100000, 2 by 010000, and so on. When any of the outputs A—J are marked, relay RA operates and the fifth bit becomes a 1; when any of the outputs K—T are marked, relay RB operates and the sixth bit becomes a 1; and when any of the outputs U—Z are marked, both relays RA and RB operate and both the fifth and sixth bits become 1s. Thus, letter A is represented by 100010; letter K by 100001; letter U by 100011; and so on. The four unused contacts in group IV may serve miscellaneous uses. It will be apparent that other coding systems can also be devised within the principles set forth above. The connections to the computer and the scanner remain the same as in FIG. 4.

While there has been described several embodiments of my invention, I wish it to be understood they are merely exemplary and are not to taken in a limiting way as those skilled in this art will readily be able to devise modifications thereof while remaining within the spirit of my invention. Also other applications for the converter of my invention will readily suggest themselves, for example, checking of inventory by salesmen.

What I claim is:

1. A character-to-binary code converter comprising a crossbar switch having plural vertical units each comprising a vertical hold magnet and a plurality of vertical contact strips, said crossbar switch also having a plurality of horizontal select magnets each associated with the vertical contact strips and a plurality of movable contacts associated with each select magnet forming a set of contact points with each set of vertical contact strips for each select magnet, whereby operation of a particular select magnet and a hold magnet closes the contacts of the set of points associated with the operated select magnet and operated hold magnet, means connected to the movable contacts for establishing thereon a set of potential values arranged in a manner representative of a character, each set of contact points for each hold magnet having established thereon a different set of potential values representative of a different character, means operable upon receipt of a first signal representative of a character to operate the select magnet whose associated contacts have established thereon a set of potential values corresponding to the signal, means immediately operable upon operation of the first select magnet to operate a hold magnet, means for releasing the select magnet after the hold magnet is operated, means operable upon receipt of a second signal representative of a character to operate the select magnet whose associated contact points have established thereon a set of potentials corresponding to the second signal, means immediately operable upon operation of the last-named select magnet to operate the next succeeding hold magnet, means for contacting the vertical contact strips of each of the vertical units to derive the set of potential values established thereon by the closed contact set, and means for transmitting the derived potential values to a remote location.

2. A converter as set forth in claim 1 wherein the potential deriving means comprises a scanner for contacting in succession each of the vertical contact strips of each of the vertical units.

3. A converter as set forth in claim 1 wherein the movable contacts in each vertical unit associated with a common horizontal are wired in multiple.

4. A converter as set forth in claim 1 for converting decimals to a binary code wherein each vertical unit comprises four vertical contact strips, and the potential values applied to the movable contacts form a binary code comprising a combination of four bits.

5. A converter as set forth in claim 1 for converting alpha characters to a binary wherein each vertical unit comprises six vertical contact strips, and means are provided for selectively connecting and disconnecting two of the vertical contact strips to the potential deriving means in accordance with the received signal.

6. A converter as set forth in claim 5 wherein the selectively connecting and disconnecting means comprises a pair of auxiliary relays coupled to the means for operating the select magnets, said auxiliary relays having contacts connected to said two vertical contact strips.

7. A converter as set forth in claim 1 wherein associated with each select magnet is horizontal off-normal contacts, and all of said horizontal off-normal contacts are connected in parallel.

8. A converter as set forth in claim 1 wherein the means for operating the next succeeding hold magnet comprises first, second, and third auxiliary relays and vertical off-normal contacts associated with each hold magnet, and further including means for operating the first relay on odd-numbered signals, means for operating the second relay upon operation of the first relay and release of the operated select magnet, and means for operating the third relay on even-numbered signals.

9. A converter as set forth in claim 8 wherein each hold magnet has associated with it first and second vertical off-normal contacts, said first vertical off-normal contacts being connected to form a locking path for the operated hold magnet, said second vertical off-normal contacts being connected to establish an operating path for the next succeeding hold magnet.